United States Patent Office 3,514,709
Patented May 26, 1970

---

3,514,709
METHOD AND DEVICE FOR AMPLIFICATION OF A LASER PULSE
Louis Jacob, Saint-Germain-les-Arpajon, France, assignor to Commissariat a l'Energie Atomique, Paris, France
Filed Feb. 27, 1969, Ser. No. 802,839
Claims priority, application France, Mar. 12, 1968, 143,426
Int. Cl. H01s 1/00
U.S. Cl. 330—4.3                                    9 Claims

ABSTRACT OF THE DISCLOSURE

A method and device for the amplification of a laser pulse in an amplifying stage comprising at least one solid-state laser and consisting in separating said pulse into two pulses $a$ and $b$, in subjecting the pulse $a$ to an optical-path delay while the pulse $b$ is amplified within said stage, then in subjecting the pulse $b$ to the same optical-path delay while the pulse $a$ is in turn amplified in the same stage and finally in recombining the two amplified pulses in space.

---

The present invention has for its object a method of amplification of a laser pulse in an amplifying stage consisting of one or a number of solid-state lasers, the aim of the method being to prevent deterioration of the active material at high energy levels. A further object of the invention is to provide a device for the practical application of the method under consideration.

It is known that the strength of materials employed in solid-state lasers is limited to a given output power. It is thus a fact, for example, that the maximum energy which can be withstood by a glass which has been doped with neodymium is approximately 120 J./cm.² in the case of a pulse lasting one microsecond; the energy is approximately 14 J./cm.² in the case of a pulse lasting one nanosecond. In consequence, the energy which is available at the time of laser action by amplification cannot wholly be utilized.

The object of the present invention is to overcome the disadvantage just mentioned by replacing the pulse to be amplified by two pulses having an amplitude which is substantially one-half, then by effecting the recombination thereof both in space and time.

More specifically, the invention is directed to a method of amplification of a laser pulse in one or a number of solid-state amplifying lasers, said method being characterised in that it consists in separating said pulse into two pulses $a$ and $b$, in subjecting the pulse $a$ to an optical-path delay while the pulse $b$ is amplified, then in subjecting the pulse $b$ to the same optical-path delay while the pulse $a$ is amplified in its turn, and finally in recombining in space the two pulses which have been amplified.

This method makes it possible to increase the efficiency of amplification chains since the energy of the output pulse can practically be doubled in value. It is also possible by means of this method to have available the whole amount of energy which is stored in the amplifiers.

The invention is also directed to a device for the practical application of the method which comprises a control laser and an amplifying stage consisting of one or a number of solid-state lasers, said device being characterized in that it additionally comprises a semi-reflecting plate for separating the pulse emitted by said control laser into two pulses, two sets of deflecting mirrors defining optical paths such that both pulses are subjected to the same time-delay relative to each other, means for selectively deviating said pulses at both ends of the amplifier stage and two optical systems for recombining said pulses in space after amplification.

Further properties and advantages of the present invention will become apparent from the following description of two embodiments of said device which is given by way of explanation but not in any sense by way of limitation. Reference is made to the accompanying drawings, in which.

Figure 1:
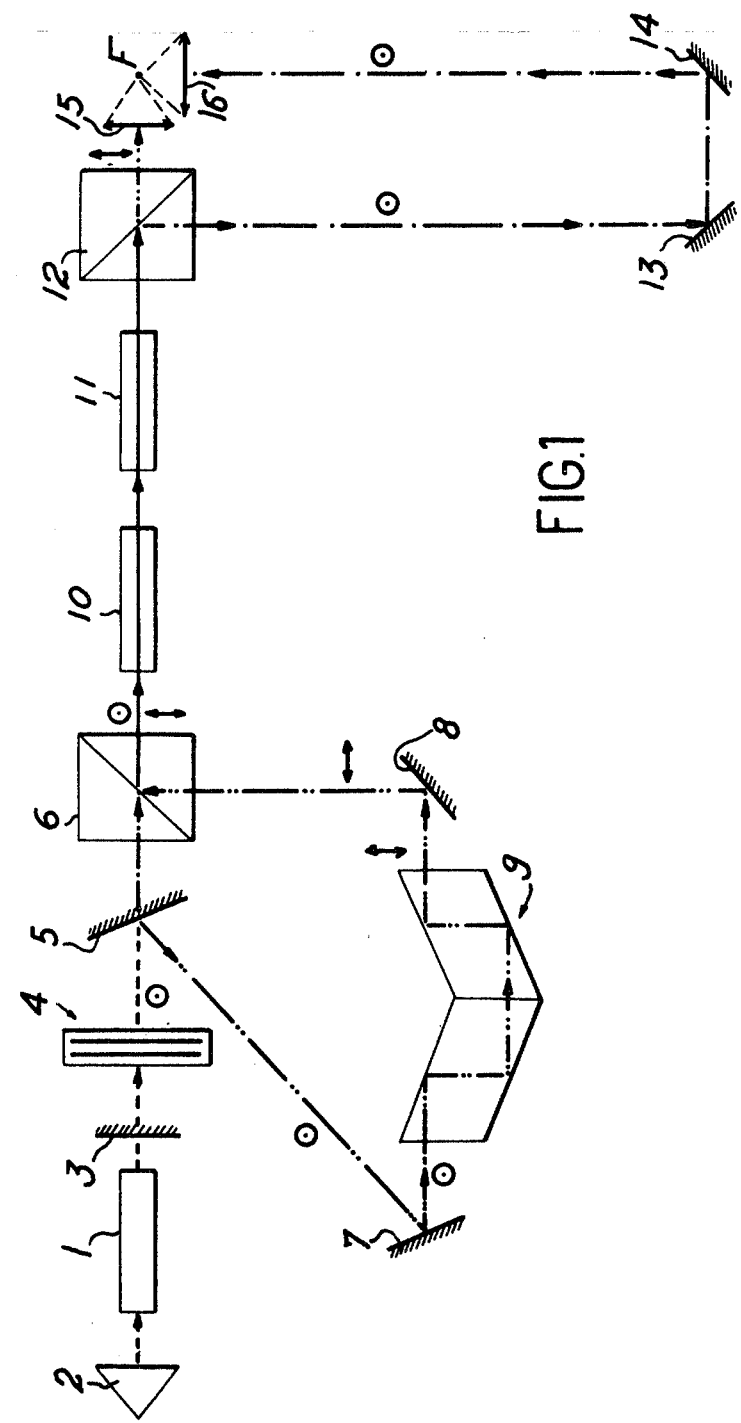
FIG. 1 illustrates a device in which the pulses are propagated in the same direction within the amplification chain.

In the device of FIG. 1, a control laser rod 1 which is associated with a rotating prism system 2 and with a semi-transparent mirror 3 emits a light pulse (having a duration of 30 nsecs., for example) which undergoes vertical polarization as it passes throough a polarizer 4. A semi-transparent mirror 5 then divides this pulse into two parts; the transmitted wave is passed directly through a Glan prism 6 whilst the reflected wave which is deviated successively by the mirrors 7 and 8 also enters the prism 6 at right angles to the transmitted wave after having incurred an optical-path delay $\tau$ (of the order of 60 nsecs., for example) with respect to said transmitted wave. During the optical delay of said reflected wave, its plane of polarization is rotated through 90° by means, for example, of a Fresnel biprism 9 or alternatively by means of a half-wave plate. If it is found desirable to ensure that the duration of the output pulse is affected as little as possible, it is accordingly important to take into account the optical delay which is imposed on the light (a few tenths of nanosecond at a maximum) during the operation last mentioned. Thus, two light waves having planes of polarization and directions at right angles to each other and separated by a time interval $\tau$ as they enter the Glan prism 6 are passed through this latter without undergoing any modification of polarization and transmitted in the same direction, namely the direction of the vertically-polarized wave.

The two pulses are thus received one after the other in an amplification chain comprising two solid-state lasers 10 and 11, then collected in a further Glan prism 12 which is crossed with respect to the first and which produces a deviation in the opposite direction. In fact, the prism receives from a same direction two light waves having planes of polarization at right angles to each other and transmits them without any modification of polarization in two directions at right angles whilst the retarded wave which is polarized horizontally is not deviated. The vertically-polarized pulse is then deviated successively by the mirrors 13 and 14 so as to be subjected in its turn to an optical-path delay $\tau$ with respect to the wave which has already been retarded. The two pulses attain respectively at the same instant the lenses 15 and 16 which concentrate them simultaneously at their common focal point F at which they are recombined.

Thus, a single pulse emitted by the control laser 1 has been separated into two parts which have been successively amplified in the same amplification chain, then recombined in space and in time.

Figure 2:
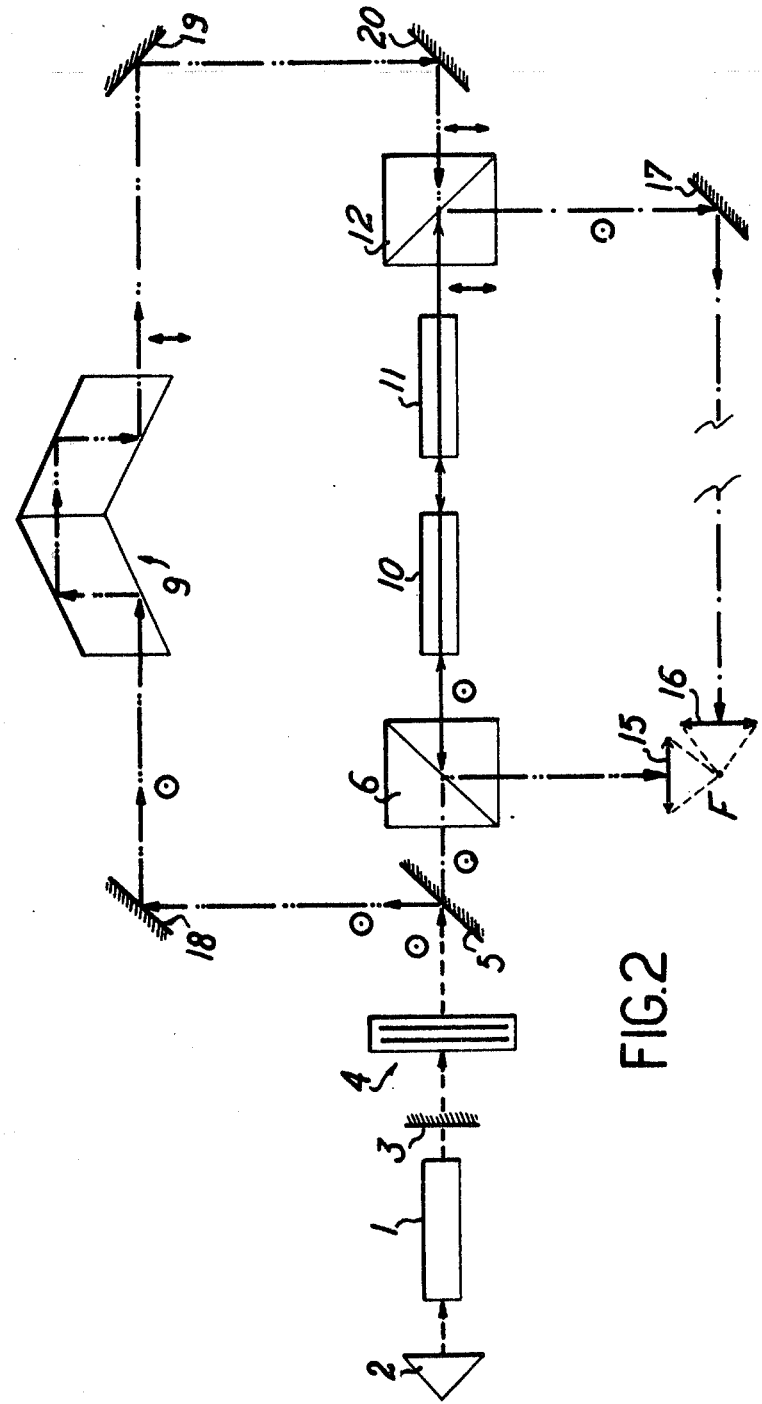
FIG. 2 illustrates another device in which the pulses are propagated in opposite directions within the amplification chain.

In this device, the two pulses are amplified and propagated in the same direction within the amplification chain but another solution which is shown in FIG. 2 consists in causing them to propagate in the opposite direction with respect to each other.

In this case, the vertically-polarized wave transmitted by the semi-transparent plate 5 is received directly by the Glan prism 6 and passes through this latter without being deviated.

At the end of the amplification chain which is formed by the two lasers 10 and 11, the second Glan prism 12 deviates the vertically-polarized wave through 90°. After further deviation by a mirror 17, the wave is subjected to an optical-path delay $\tau$ prior to being concentrated at the focus F of the lens 16. Furthermore, the light wave which is reflected from the plate 5 is successively deviated by the mirrors 18, 19 and 20 so as to incur an optical-path time lag $\tau$ with respect to the transmitted wave. As in the previous embodiment, the plane of polariation of the reflected wave is rotated through 90° by means of the Fresnel biprism 9, for example. This pulse is then received by the prism 12 and traverses this latter without deviation. At the output of the amplification chain, the prism 6 deviates the pulse through 90° and directs it to the lens 15 which concentrates it at the focus F at the same time as the other part of the initial wave.

It is readily apparent that the present invention is not limited solely to the embodiments hereinabove described by way of explanation and illustrated in the accompanying drawings and that the scope of this patent extends to alternative forms of all or part of the arrangements described which remain within the scope of equivalent means as well as to any application of such arrangements. In particular, the description of the invention has been given with reference to laser chains with two amplifying rods but it is self-evident that the method applies to a single laser as well as to a chain comprising any number of lasers. It is also clear that the Glan prisms can be replaced by any other polarizing-deviating systems which perform a similar function. Finally, it is understood that the optical-path time-delays can be achieved by any means other than those illustrated in FIGS. 1 and 2 of the accompanying drawings.

What I claim is:

1. A method of amplification of a laser pulse in an amplification stage comprising at least one solid-state laser, wherein said method consists in separating said pulse into two pulses $a$ and $b$, in subjecting the pulse $a$ to an optical-path delay while the pulse $b$ is amplified in said stage, then in subjecting the pulse $b$ to the same optical-path delay while the pulse $a$ is amplified in its turn in the same stage, and finally in recombining in space the two pulses which have been amplified.

2. A method in accordance with claim 1, wherein the two pulses are fed in at the same end of the amplification stage.

3. A method in accordance with claim 1, wherein each of the two pulses is fed in at one end of the amplification stage.

4. A method in accordance with claim 1, wherein both pulses are polarized in two planes at right angles to each other prior to being passed into the amplification stage so that said pulses may be selectively deviated at both ends of said stage by means of polarizing-deviating systems.

5. A method in accordance with claim 1, wherein the two amplified pulses are recombined in space by being brought to a focus at the same point.

6. A device comprising a control laser, an amplification stage consisting of at least one solid-state laser, a semi-reflecting laser for separating the pulse emitted by said control laser into two pulses, two sets of deflecting mirrors limiting optical paths such that the two pulses are subjected to the same relative time-delay, means for selectively deviating said pulses at the two ends of the amplification stage and two optical systems for recombining said pulses in space after amplification.

7. A device in accordance with claim 6, wherein the means for selectively deviating the two pulses at the two ends of the amplification stage comprise on the one hand elements which are intended to obtain these two polarized pulses in two planes at right angles to each other and on the other hand two polarizing-deviating systems each disposed at one end of said amplification stage.

8. A device in accordance with claim 7, wherein said elements comprise a polarizing system disposed on the path of the pulse emitted by the control laser and a Fresnel biprism disposed on the path of one of the pulses to be amplified so that its plane of polarization can be rotated through 90°.

9. A device in accordance with claim 7, wherein said polarizing-deviating systems are constituted by Glan prisms mounted in crossed relation.

References Cited

UNITED STATES PATENTS 3,292,102  12/1966  Byrne _____ 330—4.3

RICHARD A. FARLEY, Primary Examiner

C. E. WANDS, Assistant Examiner

U.S. Cl. X.R.

331—94.5